(12) United States Patent
Iida et al.

(10) Patent No.: US 7,911,508 B2
(45) Date of Patent: Mar. 22, 2011

(54) RECORDING/REPRODUCING APPARATUS AND RECORDING/REPRODUCING APPARATUS CONTROL METHOD

(75) Inventors: Kenichi Iida, Saitama (JP); Izuru Tanaka, Kanagawa (JP); Fumihiko Kato, Kanagawa (JP); Satoshi Mihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 1536 days.

(21) Appl. No.: 11/210,862

(22) Filed: Aug. 25, 2005

(65) Prior Publication Data
US 2006/0045490 A1 Mar. 2, 2006

(30) Foreign Application Priority Data
Sep. 1, 2004 (JP) ................................. 2004-254568

(51) Int. Cl.
*H04N 5/76* (2006.01)
(52) U.S. Cl. ................. 348/231.3; 348/373; 348/231.99
(58) Field of Classification Search ............... 348/231.4, 348/231.2, 231.99, 231.3, 373
See application file for complete search history.

(56) References Cited
U.S. PATENT DOCUMENTS
2004/0165108 A1* 8/2004 Okuda .......................... 348/375

OTHER PUBLICATIONS
U.S. Appl. No. 11/020,504, filed Aug. 17, 2005.
U.S. Appl. No. 11/212,810, filed Aug. 29, 2005.
U.S. Appl. No. 11/216,058, filed Sep. 1, 2005.
U.S. Appl. No. 11/212,392, filed Aug. 29, 2005, Iida et al.
U.S. Appl. No. 11/213,879, filed Aug. 30, 2005, Iida et al.
U.S. Appl. No. 11/214,745, filed Aug. 31, 2005, Iida et al.

* cited by examiner

*Primary Examiner* — David L Ometz
*Assistant Examiner* — Antoinette T Spinks
(74) *Attorney, Agent, or Firm* — Oblon, Spivak, McClelland, Maier & Neustadt, L.L.P.

(57) ABSTRACT

Disclosed are a portable recording/reproducing apparatus for recording predefined information onto a recording medium and reproducing the recorded information, and a method for controlling the apparatus. The apparatus includes a recording section to collect an external sound and output audio information in accordance with the sound collection results; a shooting section to shoot the outside and output motion picture information in accordance with shooting results; a display section to display a motion picture in accordance with the motion picture information; a retention section to retain the shooting section as desired in a ready-for-shooting state or in a storage state in which shooting cannot be performed; a detection section to detect whether or not the shooting section is retained in the ready-for-shooting state by the retention section; and a control section, which, when the detection section detects at the beginning of audio information recording that the shooting section is retained in the ready-for-shooting state, exercises control so that the motion picture based on the motion picture information appears on the display section. The apparatus can record a still picture based on a motion picture while recording audio information.

11 Claims, 7 Drawing Sheets

RECORDING/REPRODUCING APPARATUS AND RECORDING/REPRODUCING APPARATUS CONTROL METHOD

CROSS REFERENCES TO RELATED APPLICATIONS

The present invention contains subject matter related to Japanese Patent Application JP 2004-254568, filed in the Japanese Patent Office on Sep. 1, 2004, the entire contents of which being incorporated herein by reference.

BACKGROUND OF THE INVENTION

The present invention relates to a recording/reproducing apparatus and a method for controlling the apparatus, and is suitable for use, for instance, in a camera-incorporated IC (Integrated Circuit) recorder.

An IC recorder has been used as a portable audio recording/reproducing apparatus. This IC recorder uses its built-in microphone to collect an external sound, compresses/encodes the obtained audio data, and records the resulting audio data into a built-in semiconductor memory or a flash memory or other external memory such as "MEMORY STICK (Registered trademark of Sony Corporation)".

This IC recorder is small-sized, lightweight, and highly portable. In recent years, therefore, it is not only used in conferences, discussions, and other business scenes, but also widely used as a personal audio memo recorder.

In recent years, a CCD (Charge Coupled Device) camera is incorporated in the IC recorder. A still picture camera proposed, for instance, by Japanese Patent Laid-open No. 2001-69453 associates image data based on a still picture, which is picked up by a CCD camera, with audio data based on a collected sound, and reproduces (displays) a still picture with timing with which the image data is associated while reproducing the audio data.

SUMMARY OF THE INVENTION

However, when the CCD camera lens is scratched or otherwise damaged in a situation where the above-mentioned still picture camera is used, the camera lens is impaired.

It is conceivable that a mechanism for protecting the camera lens, for instance, by covering it may be furnished to the above still picture camera for the purpose of protecting the camera lens against damage. However, the user has, for instance, to expose the camera lens or perform a procedure for displaying a motion picture picked up by the CCD camera on a display section. Therefore, the user is forced to perform complicated procedures.

The present invention has been made in view of the above circumstances and provides a recording/reproducing apparatus that is capable of recording a still picture while recording audio by performing a simple procedure.

In solving the above problems, according to one embodiment of the present invention, there is provided a portable recording/reproducing apparatus for recording predefined information onto a recording medium and reproducing the recorded information. The apparatus includes a sound collection section for collecting an external sound and outputting audio information in accordance with the results of sound collection; a shooting section for shooting the outside and outputting motion picture information in accordance with results of shooting; a display section for displaying a motion picture in accordance with the motion picture information; a retention section for retaining the shooting section as desired in a ready-for-shooting state or in a storage state in which shooting cannot be performed; a detection section for detecting whether or not the shooting section is retained in the ready-for-shooting state by the retention section; and a control section, which, when the detection section detects at the beginning of audio information recording that the shooting section is retained in the ready-for-shooting state, exercises control so that the motion picture based on the motion picture information appears on the display section.

Consequently, a still picture based on a motion picture can be immediately rendered savable at the time of audio recording without urging the user to perform a complicated procedure.

According to another embodiment of the present invention, there is provided a method for controlling a portable recording/reproducing apparatus for recording predefined information onto a recording medium and reproducing the recorded information, the method including the steps of: starting the recording of audio information that is obtained by collecting an external sound; detecting whether or not the shooting section, which can be retained as desired in a ready-for-shooting state or in a storage state in which shooting cannot be performed, is retained in the ready-for-shooting state; and displaying a motion picture based on motion picture information, which is obtained by shooting an image, when a shooting section is found to be in the ready-for-shooting state at the beginning of audio information recording.

Consequently, a still picture based on a motion picture can be immediately rendered savable at the time of audio recording without urging the user to perform a complicated procedure.

According to one embodiment of the present invention, there is provided a portable recording/reproducing apparatus for recording predefined information onto a recording medium and reproducing the recorded information. The recording/reproducing apparatus includes: a sound collection section for collecting an external sound and outputting audio information in accordance with the results of sound collection; a shooting section for shooting an image and outputting motion picture information in accordance with results of shooting; a display section for displaying a motion picture in accordance with the motion picture information; a retention section for retaining the shooting section as desired in a ready-for-shooting state or in a storage state in which shooting cannot be performed; a detection section for detecting whether or not the shooting section is retained in the ready-for-shooting state by the retention section; and a control section, which, when the detection section detects at the beginning of audio information recording that the shooting section is retained in the ready-for-shooting state, exercises control so that the motion picture based on the motion picture information appears on the display section. Consequently, a still picture based on a motion picture can be immediately rendered savable at the time of audio recording without urging the user to perform a complicated procedure. Thus, it is possible to provide a recording/reproducing apparatus that is capable of recording a still picture while recording audio by performing a simple procedure.

According to another embodiment of the present invention, there is provided a method for controlling a portable recording/reproducing apparatus for recording predefined information onto a recording medium and reproducing the recorded information, the method including the steps of: starting the recording of audio information that is obtained by collecting an external sound; detecting whether or not a shooting section, which can be retained as desired in a ready-for-shooting state or in a storage state in which shooting cannot be performed, is retained in the ready-for-shooting state; and displaying a motion picture based on motion picture information, which is obtained by shooting an image, when the shooting section is found to be in the ready-for-shooting state at the beginning of audio information recording. Consequently, a still picture based on a motion picture can be immediately rendered savable at the time of audio recording without urging the user to perform a complicated procedure. Thus, it is possible to provide a method for controlling a recording/reproducing apparatus that is capable of recording a still picture while recording audio by performing a simple procedure.

DETAILED DESCRIPTION OF THE PREFERRED EMBODIMENTS

Embodiments of the present invention will now be described in detail with reference to the accompanying drawings.

Figure 1:
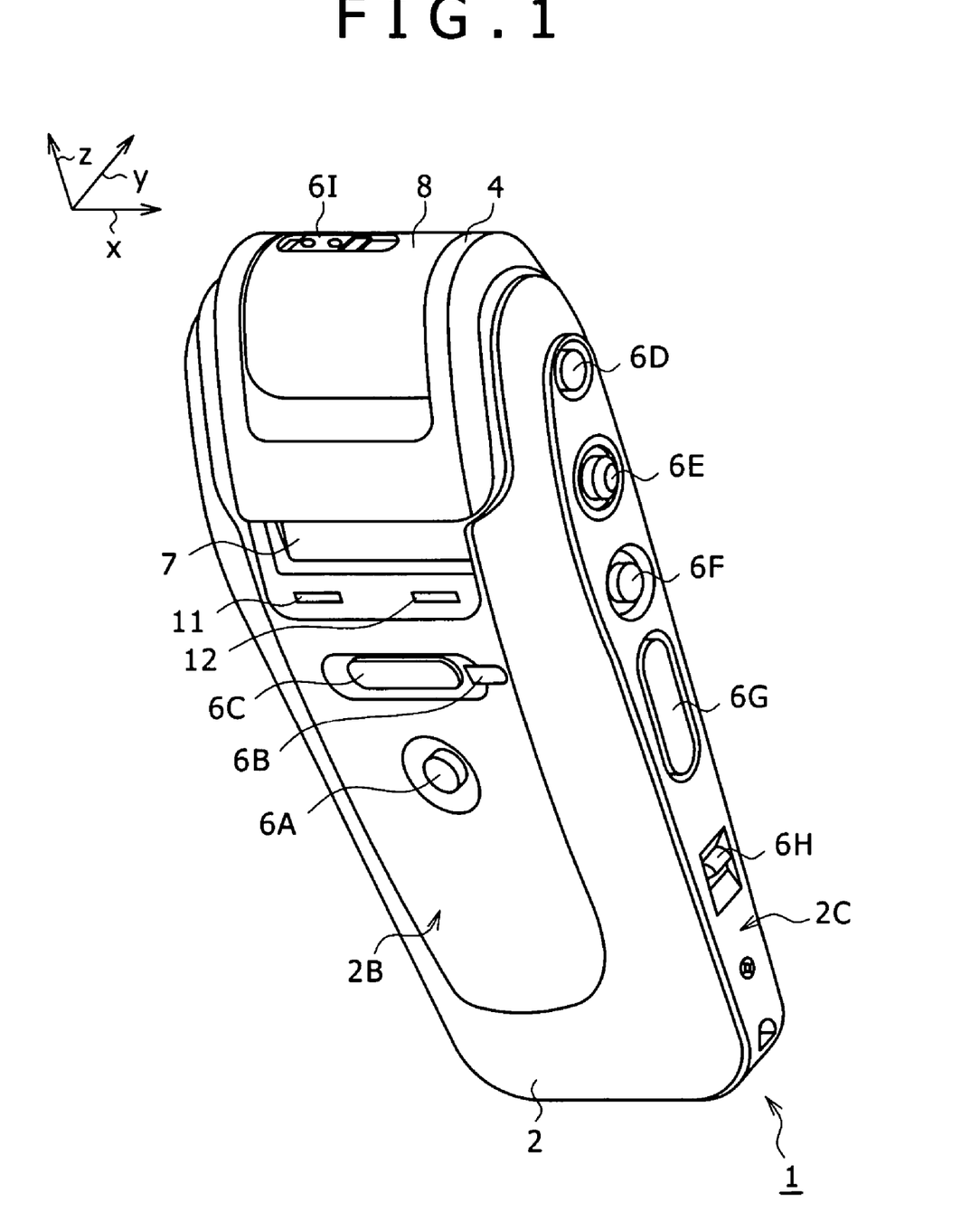
FIG. 1 is a front perspective view illustrating a camera-incorporated IC recorder (with a cover closed) according to one embodiment of the present invention.
Figure 2:
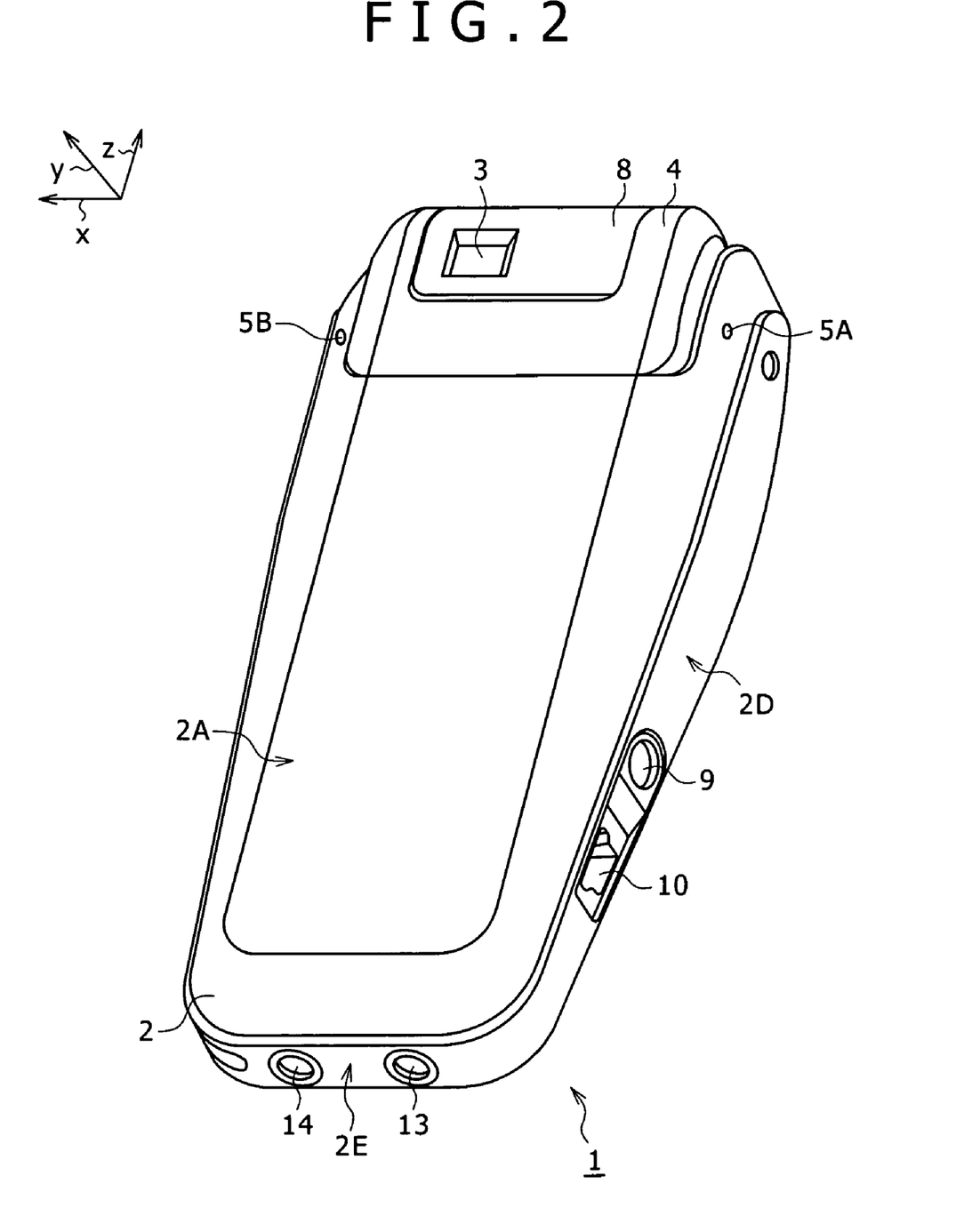
FIG. 2 is a rear perspective view illustrating a camera-incorporated IC recorder according to one embodiment of the present invention.
Figure 3:
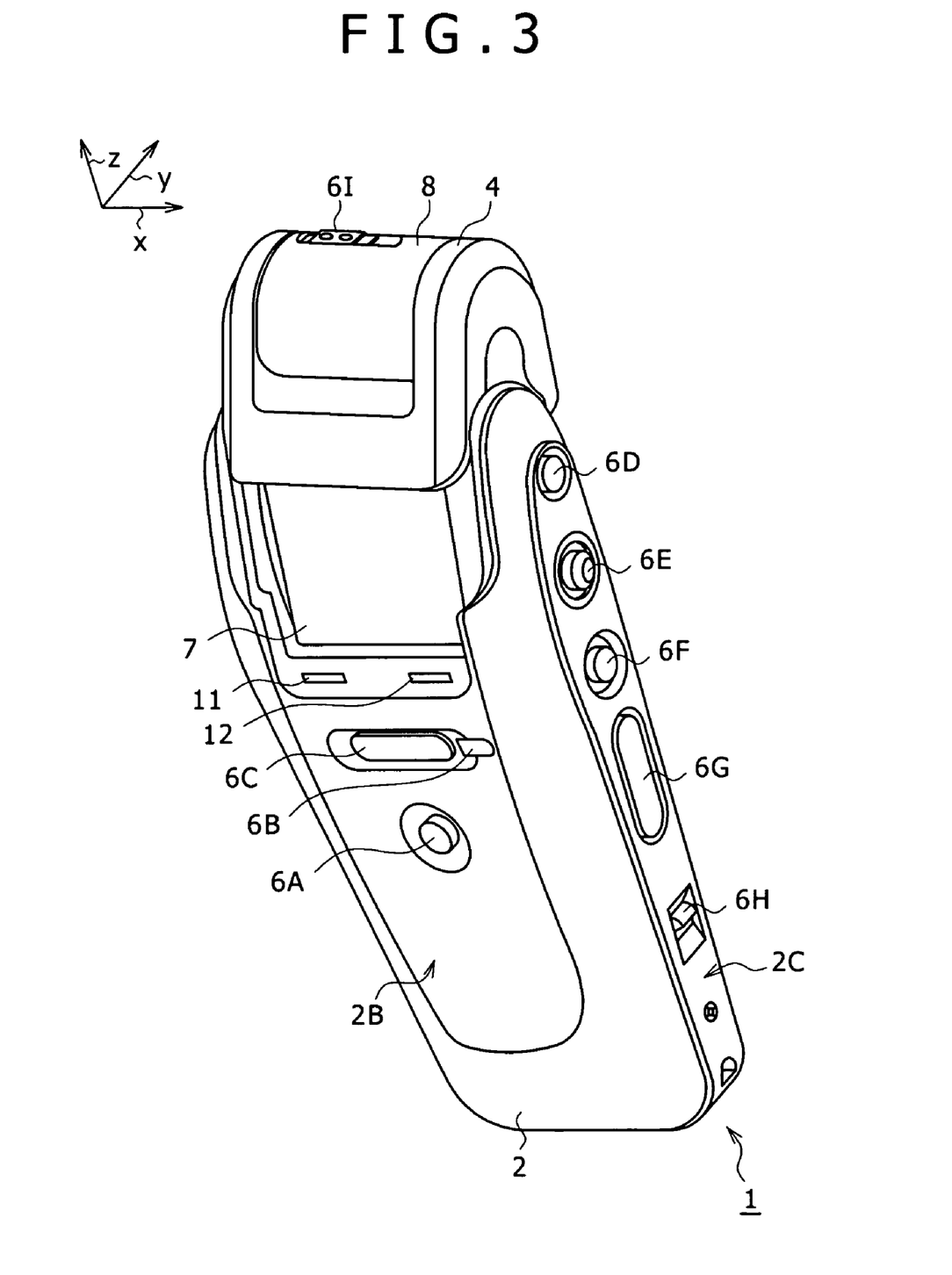
FIG. 3 is a front perspective view illustrating a camera-incorporated IC recorder (with a cover open) according to one embodiment of the present invention.

(1) Configuration of a Camera-Incorporated IC Recorder According to an Embodiment of the Present Invention In FIGS. 1 to 3, the reference numeral 1 denotes a camera-incorporated IC recorder 1 according to an embodiment of the present invention. An LCD (Liquid Crystal Display) cover section 4 is mounted on the top of a main body section 2, which is longer than wide. The LCD cover section 4 can be freely slid upward (in the direction of arrow z). A CCD (Charge Coupled Device) camera 3 is mounted on the LCD cover section 4.

Sound collection holes 5A, 5B are provided in the right- and left-hand upper ends of a rear surface 2A of the main body section 2. Microphones 20A, 20B (FIG. 5) are installed inside the sound collection holes 5A, 5B, respectively. The microphones 20A, 20B can collect an external sound through the sound collection holes 5A, 5B.

A record button 6A is mounted in the middle of a front surface 2B of the main body section 2. The record button 6A is pressed to start recording an external sound that is picked up by the microphones 20A, 20B.

As shown in FIG. 3, a high-resolution, color LCD 7 is mounted in the upper position of the front surface 2B of the main body section 2. A live view button 6B is positioned below the LCD 7. When the live view button 6B is pressed while the LCD cover section 4 is pulled upward to its open position as shown in FIG. 3 and a column-shaped camera cover 8, which is positioned in the LCD cover section 4, is rotated and opened so that the CCD camera 3 is exposed view as described hereinafter, a motion picture that is currently picked up by the CCD camera 3 appears on the LCD 7.

A camera shutter button 6C is positioned to the left of the live view button 6B, which is in the middle of the front surface 2B of the main body section 2. When the camera shutter button 6C is pressed while a motion picture is displayed on the LCD 7, one frame (still picture) of the motion picture displayed on the LCD 7, which is displayed the moment the camera shutter button 6C is pressed, is acquired and saved. Thus, the camera-incorporated IC recorder 1 makes it possible to record a desired still picture while viewing a motion picture displayed on the LCD 7.

A menu button 6D is mounted on a right-hand side 2C of the main body section 2. When the menu button 6D is pressed, a predetermined menu screen appears on the LCD 7. A jog lever 6E is positioned below the menu button 6D, which is mounted on the right-hand side 2C of the main body section 2. It is possible to select a desired option from the menu screen and finalize the resulting option selection by moving the jog lever 6E upward, downward, leftward, or rightward or by pressing it.

A stop button 6F is positioned below the jog lever 6E, which is mounted on the right-hand side 2C of the main body section 2. A rocker-type volume button 6G is positioned below the stop button 6F. The stop button 6F is pressed to stop a recording operation or reproducing operation. Pressing the upper or lower end of the volume button 6G during a reproducing operation increases or decreases the volume of a playback sound, which is output from a speaker 32 (FIG. 5) that is mounted on the rear of the LCD 7.

A voice-up switch (slide switch) 6H is positioned below the volume button 6G, which is mounted on the right-hand side 2C of the main body section 2. When the voice-up switch 6H is turned on during a reproducing operation by sliding it upward, a sound recorded at a low level can be output at a high level while maintaining the volume level of a sound that is recorded at a high level.

A power connector 9 is mounted on a left-hand side 2D of the main body section 2. When the plug of a specified power supply kit is inserted into the power connector 9, it is possible to supply power to the camera-incorporated IC recorder 1 or charge a built-in battery (not shown) within the camera-incorporated IC recorder 1.

A USB (Universal Serial Bus) connector 10 is positioned below the power connector 9, which is mounted on the left-hand side 2D of the main body section 2. The camera-incorporated IC recorder 1 can be USB-connected to a personal computer or other external device via the USB connector 10. The use of the USB connector 10 permits the camera-incorporated IC recorder 1 to output recorded audio data and recorded image data saved in the camera-incorporated IC recorder 1 to a USB-connected external device and acquire audio data and image data from such an external device.

A charge LED (Light Emitting Diode) 11 and an operation LED 12 are positioned directly below the LCD 7, which is mounted on the front surface 2B of the main body section 2. The charge LED 11 glows while the built-in battery is being charged. The operation LED 12 glows during a recording or reproducing operation. When the user views the status of the charge LED 11 or operation LED 12, the user can easily detect whether a charge, recording, or other operation is being properly performed.

A microphone jack 13 and a headphone jack 14 are mounted on a bottom surface 2E of the main body section 2. When the output plug of an external microphone (not shown) is inserted into the microphone jack 13, it is possible to acquire and record an external sound that is picked up by the external microphone. When the input plug of an external headphone (not shown) is inserted into the headphone jack 14, the external headphone enables the user to listen to a recorded sound that is reproduced during a reproducing operation.

The LCD cover section 4 is shaped so as to cover approximately two-thirds the surface of the LCD 7 of the main body section 2 while the LCD cover section 4 is closed as indicated FIGS. 1 and 2. Therefore, when the LCD cover section 4 is closed while the camera-incorporated IC recorder 1 is not used, the LCD 7 is protected by the LCD cover section 4. When, on the other hand, the LCD cover section 4 is opened by pulling it upward as indicated in FIG. 3 to use the camera-incorporated IC recorder 1, the LCD 7 is exposed so that the user can view the menu screen and various other information displayed on the LCD 7.

The column-shaped camera cover 8, which can be freely rotated, is mounted on the top of the LCD cover section 4. The aforementioned CCD camera 3 is mounted on a predetermined portion of the camera cover 8 in such a manner that the optical axis of the CCD camera 3 is perpendicular to the central axis of the camera cover 8.

Figure 4A:
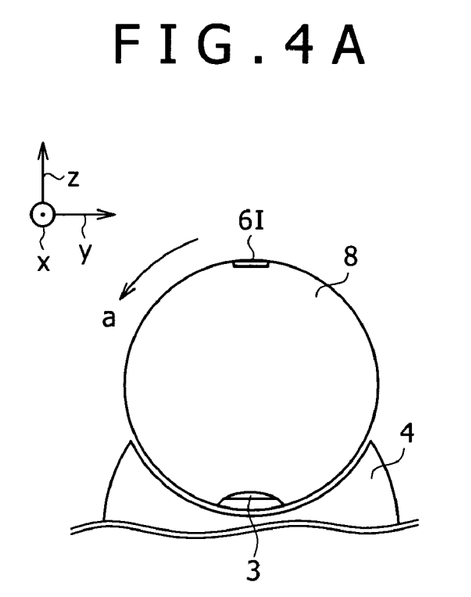
FIGS. 4A, 4B, and 4C are schematic diagrams illustrating various rotary positions of a camera cover.
Figure 4B:
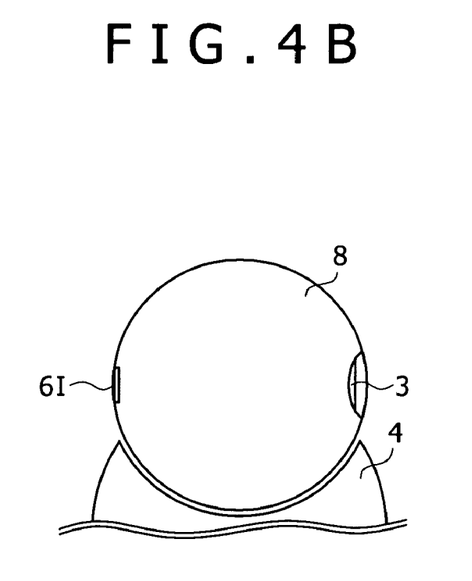

The camera cover 8 can be rotated in the direction of arrow "a" and in the opposite direction while the CCD camera 3 is positioned between a rotary position at which the CCD camera 3 is hidden by the LCD cover section 4 (this rotary position is hereinafter referred to as the home position) as shown in FIG. 4A and a rotary position at which the optical axis of the CCD camera 3 roughly agrees with the direction of the normal line of the front surface 2B of the main body section 2 (this rotary position is hereinafter referred to as the end position) as shown in FIG. 4B.

Figure 4C:
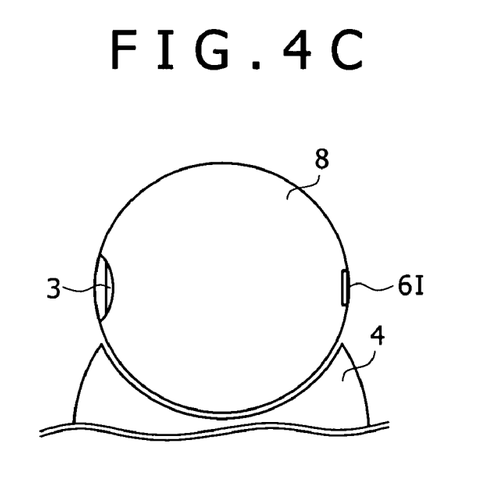

Consequently, the CCD camera 3 is protected when the camera cover 8 is closed by placing it in the home position while the camera-incorporated IC recorder 1 is not used. When the closed camera cover 8 is rotated in the direction of arrow "a" until it is opened with the CCD camera 3 exposed toward the rear surface 2A of the main body section 2 as shown in FIG. 4B, it is possible to pick up a desired image while viewing the motion picture displayed on the LCD 7. When the opened camera cover 8 is rotated in a direction opposite to the direction of arrow "a" until it reaches the end position, it is possible to shoot the face of the user while viewing the motion picture displayed on the LCD 7 as indicated in FIG. 4C.

The camera cover 8 is provided with a macro switch 6I. When the macro switch 6I is turned on to select a macro mode, it is possible to shoot a close-up of the subject with the CCD camera 8 positioned close to the subject. The macro switch 6I is positioned 180° away from the CCD camera 3. This permits the user to easily turn on the macro switch 6I when the user views the motion picture displayed on the LCD and determines that the use of the macro mode is necessary.

(2) Internal Configuration of the Camera-Incorporated IC Recorder

Figure 5:
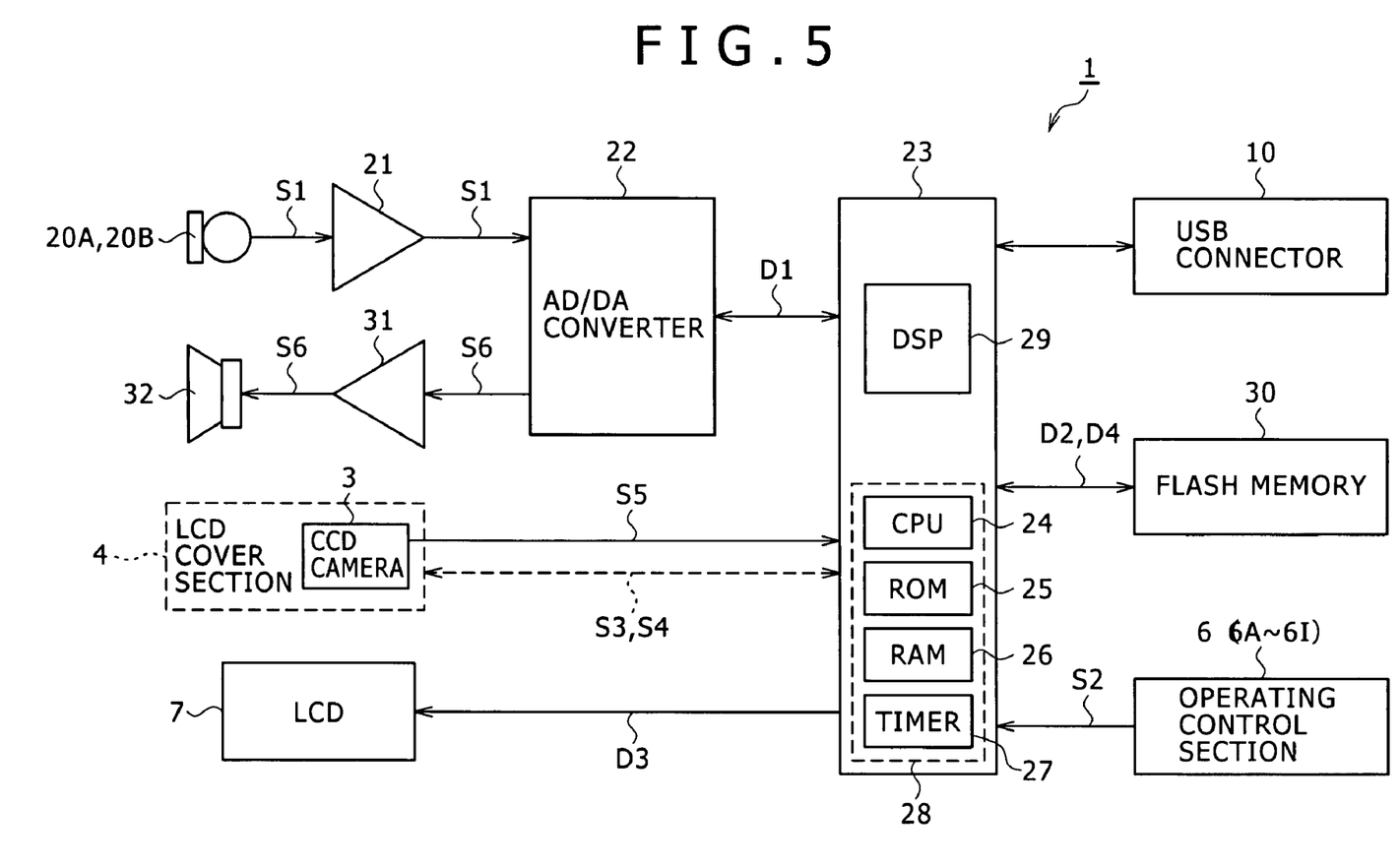
FIG. 5 is a block diagram illustrating the circuit configuration of a camera-incorporated IC recorder according to one embodiment of the present invention.

FIG. 5 shows the internal configuration of the camera-incorporated IC recorder 1.

When the camera-incorporated IC recorder 1 is turned on, the microphones 20A, 20B collect an external sound. Obtained audio signals S1 are forwarded to an AD (analog-to-digital)/DA (digital-to-analog) converter 22 via an amplifier 21. The AD/DA converter 22 sequentially subjects the audio signals S1, which are supplied from the microphones 20A, 20B, to a digital conversion process, and sequentially transmits obtained audio data D1 to a data processing/control section 23.

The data processing/control section 23 includes a microcomputer-based control section 28 and a DSP (Digital Signal Processor) 29. The control section 28 includes a CPU (Central Processing Unit) 24, which exercises overall control over the camera-incorporated ID recorder 1, a ROM (Read Only Memory) 25 for storing various programs, a RAM (Random Access Memory) 26, which serves as a work memory for the CPU 24, and a built-in timer 27. The DSP 29 is capable of compressing/decompressing audio data D1 and image data D3, which is described later.

When the aforementioned record button 6A, live view button 6B, camera shutter button 6C, menu button 6D, jog lever 6E, stop button 6F, volume switch 6G, voice-up switch 6H, or macro switch 6I, which compose an operating control section 6, is operated, the operating control section 6 gives the associated operating input signal S2 to the control section 28 of the data processing/control section 23.

A sensor (not shown) that is mounted inside the LCD cover section 4 gives an LCD cover status signal S3 and a camera cover status signal S4 to the control section 28. The LCD cover status signal S3 indicates whether the LCD cover section 4 is closed (FIGS. 1 and 2) or open (FIG. 3). The camera cover status signal S4 indicates whether the camera cover 8 is closed (FIG. 4A) or open (FIGS. 4B and 4C).

The CPU 24 in the control section 28 recognizes an operation performed by the user in accordance with the operating input signal S2, detects the current status of the LCD cover section 4 and camera cover 8 in accordance with the LCD cover status signal S3 and camera cover status signal S4, and performs various control processes in accordance with the recognition and detection results and various control programs stored in the ROM 25.

When the operating input signal S2 causes the CPU 24 to recognize that the record button 6A in the operating control section 6 is pressed, the CPU 24 determines the status of the LCD cover section 4 and camera cover 8 in accordance with the LCD cover status signal S3 and camera cover status signal S4. When the CPU 24 detects that at least either the LCD cover section 4 or camera cover 8 is closed, the CPU 24 changes the operation mode to an audio recording mode and controls the DSP 29 accordingly. Under the control of the CPU 24, the DSP 29 performs an audio compression process on the audio data D1, which is fed from the AD/DA converter 22, in compliance with an LPEC (Sony Corporation's registered trademark) or other predetermined audio compression method, and sequentially stores the resulting compressed audio data D2 in a flash memory 30.

When the operating input signal S2 later causes the CPU 24 to recognize that the stop button 6F is pressed, the CPU 24 controls the DSP 29 to stop the audio compression process that is performed on the audio data D1 fed from the AD/DA converter 22, generate a new business folder within a user-selected folder, file the compressed audio data D2 in the same audio file format as employed by an existing IC recorder, place the obtained audio file in the generated business folder, and store the management information about the business folder in a predetermined management file.

When the LCD cover status signal S3 and camera cover status signal S4 cause the CPU 24 to detect that the LCD cover section 4 and camera cover 8 are both open, the CPU 24 changes the operation mode to a camera mode and controls the CCD camera 3 to start the CCD camera 3. As a result, the CCD camera 3 sequentially outputs image signals S5 concerning a scene that is picked up by the CCD camera 3. The output image signals S5 are then given to the data processing/control section 23.

When, in this instance, the operating input signal S2 causes the CPU 24 to recognize that the live view button 6B is pressed, the CPU 24 controls the DSP 29 accordingly. The DSP 29 then sequentially digitizes the image signals S5 fed from the CCD camera 3 and transmits the obtained image data D3 to the LCD 7. As a result, the LCD 7 displays in real time the motion picture of a scene that is based on the image data D3 and currently picked up by the CCD camera 3.

When the operating input signal S2 later causes the CPU 24 to recognize that the camera shutter button 6C is pressed, the CPU 24 controls the DSP 29 accordingly. The DSP 29 then acquires the image data D3 about a still picture frame of the moment when the camera shutter button 6C is pressed that is obtained according to the image data D3, performs an image compression process, which conforms, for instance, to the JPEG (Joint Photographic Experts Group) or other preestablished image compression method, on the acquired image data D3, and stores the obtained compressed image data D4 in the flash memory 30.

The CPU 24 then generates a business folder in the user-selected folder, places in the business folder an image file that contains the compressed image data D4, and stores the management information about the business folder in the aforementioned management file.

When the operating input signal S2 causes the CPU 24 to recognize that the record button 6A is pressed, the CPU 24 determines the status of the LCD cover section 4 and camera cover 8 in accordance with the LCD cover status signal S3 and camera cover status signal S4. When it is detected that the LCD cover section 4 and camera cover 8 are both open, the CPU 24 changes the operation mode to an audio/video recording mode and controls the DSP 29 accordingly.

As is the case in the aforementioned audio recording mode, the DSP 29 sequentially performs a predetermined audio compression process on the audio data D1 fed from the AD/DA converter 22, and stores the obtained compressed audio data D2 in the flash memory 30. As is the case in the aforementioned camera mode, the DSP 29 then sequentially digitizes the image signals S5 fed from the CCD camera 3 and transmits the obtained image data D3 to the LCD 7. As a result, the LCD 7 displays in real time the motion picture of a scene that is based on the image data D3 and currently picked up by the CCD camera 3.

When the operating input signal S2 later causes the CPU 24 to recognize that the camera shutter button 6C is pressed, the CPU 24 controls the DSP 29 accordingly. As is the case in the camera mode, the DSP 29 then acquires the image data D3 about a still picture frame of the moment when the camera shutter button 6C is pressed that is obtained in accordance with the image signals S5, which are fed from the CCD camera 3, and performs an image compression process on the acquired image data D3.

Further, the DSP 29 stores the compressed image data D4, which is derived from the image compression process, in the flash memory 30. The compressed image data D4 is stored as the compressed image data for a marker image (hereinafter referred to as a bookmark image) for the search to be conducted after the camera shutter button 6C is pressed. When the compressed image data D4 is stored, it is associated with the positions of the compressed audio data D2, which are sequentially stored in the flash memory 30.

When the operating input signal S2 later causes the CPU 24 to recognize that the stop button 6F is pressed, the CPU 24 generates a business folder in the user-selected folder, places the audio file containing the compressed audio data D2 and image files containing the aforementioned compressed image data D4, which are associated with the audio file, in the business folder, and stores the management information about the business folder in the aforementioned management file.

As described above, the camera-incorporated IC recorder 1 is capable of recording audio and a still picture on an individual basis and recording a still picture as a bookmark image that is associated with the recorded audio.

In accordance with the bookmark image that is associated with audio and recorded, the camera-incorporated IC recorder 1 can search for a desired business folder and a desired audio position within a business folder.

When the operating input signal S2 causes the CPU 24 to recognize that the jog lever 6E is pressed to issue an instruction for opening a selection screen for selecting a desired business folder within a desired folder (hereinafter referred to as the business folder selection screen) or a selection screen for selecting a desired bookmark image within the business folder (hereinafter referred to as the bookmark image selection screen), the CPU 24 reads the associated image data D3 from the ROM 25 and transmits the image data D3 to the LCD 7. The LCD 7 then opens the business folder selection screen 33, which is shown in FIG. 6, or the bookmark image selection screen 34 (FIG. 6), which is configured the same as the business folder selection screen 33.

To cause the LCD 7 to open the business folder selection screen 33, the CPU 24 reads from the flash memory 30 the image file (compressed image data D4) for a representative bookmark image (hereinafter referred to as the representative image) preselected for each business folder within the folder, causes the DSP 29 to decode the read image file, and generates thumbnail images P1-P6, which are of a predetermined size, in accordance with the obtained image data D3.

Figure 6:
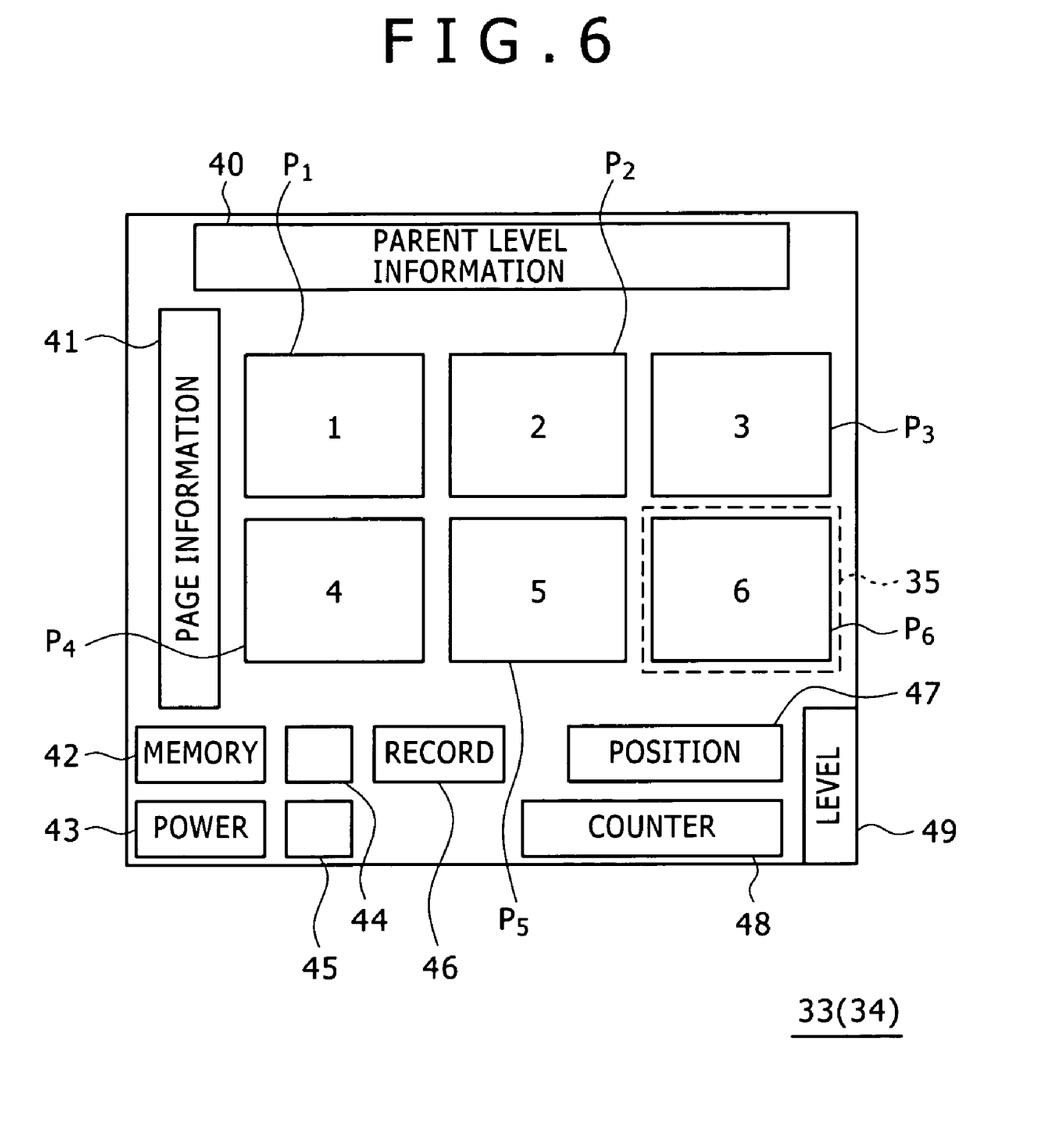
FIG. 6 is a schematic diagram illustrating the configuration of a screen such as a business folder selection screen.

As shown in FIG. 6, the CPU 24 lists the thumbnail images P1-P6 for a business folder within the business folder selection screen 33. If the business folder contains audio only and does not contain any still picture, predetermined icons are displayed instead of the thumbnail images.

When the jog lever 6E is operated later to choose one of the thumbnail images P1-P6 from the business folder selection screen 33, the CPU 24 reads the audio file (compressed audio data D2) in the associated business folder from the flash memory 30 in accordance with the aforementioned management file, and causes the DSP 29 to perform a decoding process on the read audio file.

Consequently, the audio data D1, which is derived from the decoding process, is output from the DSP 29 and converted to the analog equivalent in the AD/DA converter 22. The converted audio signal S6 is fed to a speaker 32 via an amplifier 31. The speaker 32 outputs a sound that is based on the audio signal S6.

Similarly, to display the bookmark image selection screen 34 (FIG. 6) on the LCD 7, the CPU 24 reads the image file (compressed image data D4) for each bookmark image in the associated business folder from the flash memory 30 in accordance with the management file, causes the DSP 29 to decode the read image file, and generates thumbnail images P1-P6, which are of a predetermined size, in accordance with the obtained image data D3. The CPU 24 then lists the obtained thumbnail images P1-P6 for individual bookmark images within the bookmark image selection screen 34.

When the jog lever 6E is operated later to choose one of the thumbnail images P1-P6 from the bookmark image selection screen 34, the CPU 24 reads from the flash memory 30 the compressed audio data D2 placed after audio sections that are associated with the original bookmark images for the thumbnail images P1-P6 in the associated audio file, and causes the DSP 29 to perform a decoding process on the compressed audio data D2.

Consequently, the audio data D1, which is derived from the decoding process, is output from the DSP 29 and converted to the analog equivalent in the AD/DA converter 22. The converted audio signal S6 is fed to the speaker 32 via the amplifier 31. In accordance with the audio signal S6, the speaker 32 then outputs a sound that is placed after the audio position associated with the user-selected bookmark image in the selected business folder.

As described above, the camera-incorporated IC recorder 1 is capable of accessing a desired business folder or a desired audio position within a business folder quickly and easily in accordance with a business folder representative image and each bookmark image within a business folder.

As regards a business folder containing an audio file, the camera-incorporated IC recorder 1 can also record a new bookmark when reproducing the audio file. As regards a business folder that contains an image file only, the camera-incorporated IC recorder 1 makes it possible to record audio later after associating it with the image file.

In reality, the CPU 24 has detected in accordance with the LCD cover status signal S3 and camera cover status signal S4 that the LCD cover section 4 and camera cover 8 are both open. If, in a situation where an audio file in the user-selected business folder is being reproduced as described above, the operating input signal S2 causes the CPU 24 to recognize that the camera shutter button 6C is pressed, the CPU 24 controls the DSP 29 accordingly.

Under the control of the CPU 24, the DSP 29 acquires the image data 3D about a still picture frame of the moment when the camera shutter button 6C is pressed that is obtained in accordance with the image signals S5, which are fed from the CCD camera 3, and performs an image compression process on the acquired image data D3. The DSP 29 then associates the compressed image data D4, which is derived from the image compression process, with the currently played audio file, and stores the compressed image data D4 in the flash memory 30 as the image file for a bookmark image that prevails the moment the camera shutter button 6C is pressed.

When the operating input signal S2 causes the CPU 24 to recognize that a business folder containing an image file only is selected from the business folder selection screen 33 (FIG. 6) displayed on the LCD 7, and that the record button 6A is pressed after the jog lever 6E is operated to issue an instruction for performing an additional recording operation in relation to the business folder, the CPU 24 controls the DSP 29 accordingly.

Under the control of the CPU 24, the DSP 29 performs an audio compression process on the audio data D1 fed from the AD/DA converter 22, associates the obtained compressed audio data D2 with its image file as an audio file, and stores the compressed audio data D2 in the flash memory 30. In this case, a still picture based on the original image file is automatically set for the bookmark image at the leading position of the additionally recorded audio.

As described above, the camera-incorporated IC recorder is capable of additionally recording a bookmark image at a desired position of the recorded audio or associating the audio with a recorded still picture and additionally recording the associated audio. Thus, the camera-incorporated IC recorder can provide increased capability for searching for a desired audio recording and offer improved IC recorder functionality.

(3) Function for Automatically Displaying a Motion Picture During Audio Recording The automatic motion picture display function incorporated in the camera-incorporated IC recorder 1 will now be described.

The camera-incorporated IC recorder 1 can freely retain a ready-for-shooting state in which the LCD cover section 4 and camera cover 8 are both open or a storage state in which at least either the LCD cover section 4 or camera cover 8 is closed and shooting cannot be performed. When the record button 6A is pressed, the camera-incorporated IC recorder 1 determines whether the LCD cover section 4 and camera cover 8 are retained in the ready-for-shooting state. When the ready-for-shooting state is retained, the camera-incorporated IC recorder 1 automatically displays a motion picture on the LCD 7.

In reality, when the CPU 24 recognizes that the record button 6A is pressed in response to the operating input signal S2, the CPU 24 determines whether the LCD cover section 4 and camera cover 8 are retained in the ready-for-shooting state. If it is detected that the LCD cover section 4 and camera cover 8 are retained in the ready-for-shooting state, the CPU 24 changes the operation mode to the audio/video recording mode and exercises CCD camera control to start up the CCD camera 3. Consequently, the image signals S5 concerning the scene picked up by the CCD camera 3 are sequentially output from the CCD camera 3 and fed to the data processing/control section 23.

The CPU 24 then controls the DSP 29 accordingly to sequentially digitize the image signals S5 fed from the CCD camera 3, and transmits the obtained image data D3 to the LCD 7. Consequently, the LCD 7 immediately displays a motion picture of the scene that is based on the image data D3 and currently picked up by the CCD camera 3.

When the LCD cover section 4 and camera cover 8 are retained in the ready-for-shooting state after the operation mode is changed to the audio recording mode with the LCD cover section 4 and camera cover 8 retained in a state where shooting cannot be performed, the camera-incorporated IC recorder 1 changes the operation mode to the audio/video recording mode and automatically displays a motion picture on the LCD 7.

In reality, when the operating input signal S2 causes the CPU 24 to recognize that the record button 6A in the operating control section 6 is pressed, the CPU 24 determines whether the LCD cover section 4 and camera cover 8 are retained in the ready-for-shooting state. If the CPU 24 does not detect that the LCD cover section 4 and camera cover 8 are retained in the storage state where shooting can be performed, the CPU 24 changes the operation mode to the audio recording mode and controls the DSP 29 accordingly. As is the case in the aforementioned audio recording mode, the DSP 29 then sequentially performs a predetermined audio compression process on the audio data D1 fed from the AD/DA converter 22, and stores the obtained compressed audio data D2 in the flash memory 30.

When it is detected later that the LCD cover section 4 and camera cover 8 are retained in the ready-for-shooting state, the CPU 24 changes the operation mode to the audio/video recording mode and controls the DSP 29 accordingly.

In this instance, the DSP 29 exercises CCD camera control to start up the CCD camera 3. Consequently, the image signals S5 concerning the scene picked up by the CCD camera 3 are sequentially output from the CCD camera 3 and fed to the data processing/control section 23.

The CPU 24 then controls the DSP 29 accordingly to sequentially digitize the image signals S5 fed from the CCD camera 3, and transmits the obtained image data D3 to the LCD 7. Consequently, the LCD 7 immediately displays a motion picture of the scene that is based on the image data D3 and currently picked up by the CCD camera 3.

When the motion picture appears on the LCD 7, the timer 27 in the control section 28 counts the elapsed time from the instant the LCD 7 begins to display the motion picture (hereinafter referred to as the motion picture display time). When the CPU 24 recognizes that the counted elapsed time is, for instance, five minutes, the CPU 24 controls the LCD 7 so that the LCD 7 stops displaying the motion picture and places the LCD 7 in a sleep state. In this manner, the camera-incorporated IC recorder 1 is capable of effectively reducing the power consumption.

When the LCD 7 is placed in the sleep state as described above, the timer 27 in the control section 28 counts the elapsed time from the instant the LCD 7 is placed in the sleep state (hereinafter referred to as the LCD sleep time). When the CPU 24 recognizes that the counted elapsed time is, for instance, five minutes, the CPU 24 causes the LCD 7 to display the motion picture again. In this manner, the camera-incorporated IC recorder 1 is capable of urging the user to press the camera shutter button 6C at predetermined time intervals.

Figure 7:
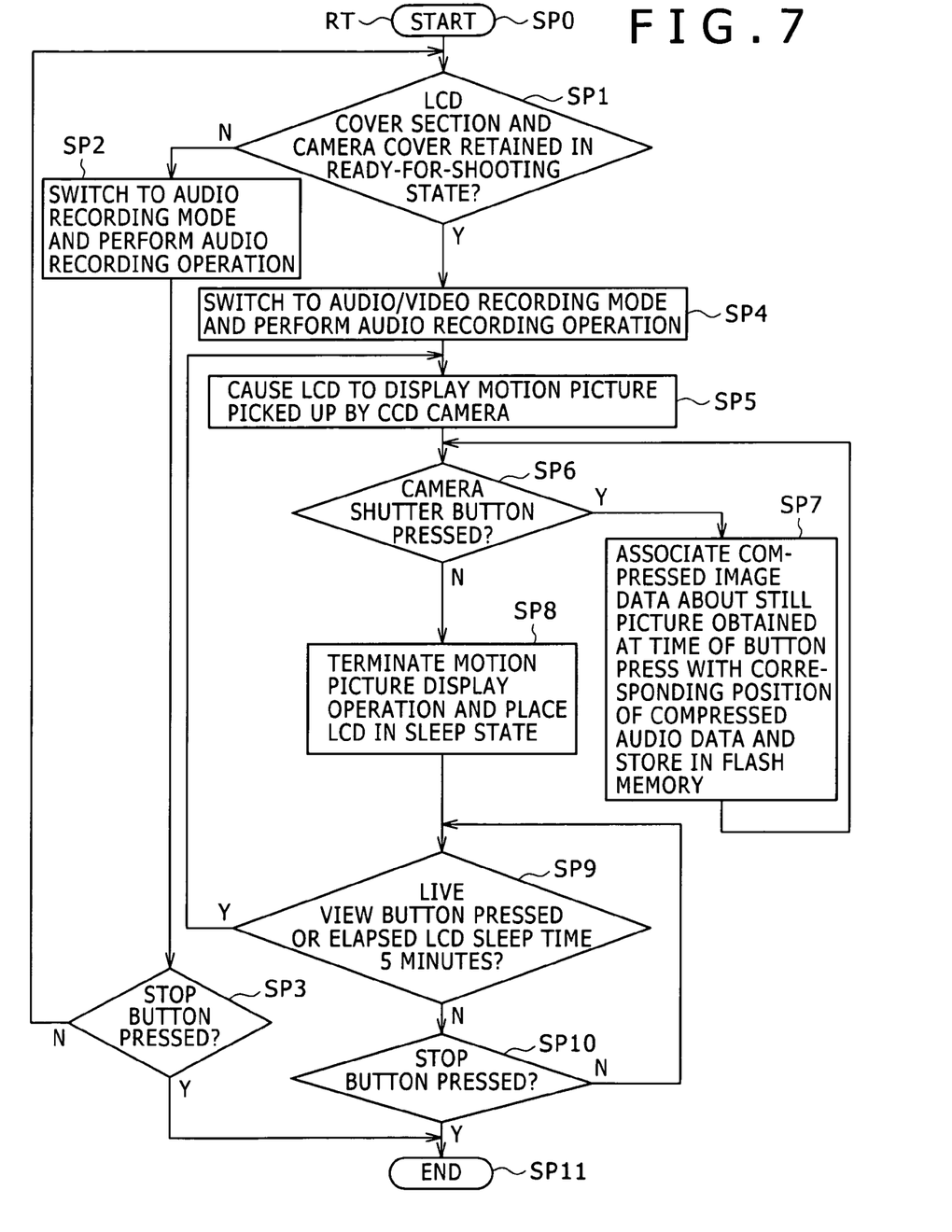
FIG. 7 is a flowchart illustrating an automatic motion picture display control processing procedure for audio recording.

(4) Automatic Motion Picture Display Control Processing Procedure to be Performed for Audio Recording The control process executed by the CPU 24 for the audio recording operation described above is based on a control program stored in the ROM 25 within the control section 28 and performed by following an automatic motion picture display control processing procedure for audio recording RT, which is shown in FIG. 7.

When the operating input signal S2 causes the CPU 24 to recognize that the record button 6A is pressed, the CPU 24 begins in step SP0 to perform the automatic motion picture display control processing procedure for audio recording RT. Step SP1 is then followed so that the CPU 24 determines whether the LCD cover section 4 and camera cover 8 are retained in the ready-for-shooting state. If a negative result is obtained in step SP1, the CPU 24 proceeds to step SP2, changes the operation mode to the audio recording mode, and initiates an audio recording operation.

Next, the CPU 24 proceeds to step SP3 and determines whether the stop button 6F is pressed to stop the audio recording operation. If a negative result is obtained in step SP3, the CPU 24 returns to step SP1 and then repeats the same process by performing steps SP1 to SP3. When the user later presses the stop button 6F so that an affirmative result is obtained in step SP3, the CPU 24 proceeds to step SP12 and terminates the automatic motion picture display control processing procedure for audio recording RT.

If, on the other hand, an affirmative result is obtained in step SP1, the CPU 24 proceeds to step SP4, changes the operation mode to the audio/video recording mode, and initiates an audio recording operation. Next, the CPU 24 proceeds to step SP5 and causes the LCD 7 to display the motion picture of the scene currently picked up by the CCD camera 3.

Next, the CPU 24 proceeds to step SP6 and determines whether the camera shutter button 6C is pressed. If an affirmative result is obtained in step SP6, the CPU 24 proceeds to step SP7. In step SP7, the CPU 24 associates the image data D3, which corresponds to the instant at which the camera shutter button 6C is pressed, with the position of the compressed audio data D2, and stores the image data D3 in the flash memory 30 as the compressed image data D4. The CPU 24 then returns to step SP6 and repeats the same process by performing steps SP6 and SP7.

Later on, the CPU 24 proceeds to step SP8, exercises LCD control so that the LCD 7 stops displaying the motion picture, and places the LCD 7 in the sleep state. Next, the CPU 24 proceeds to step SP9 and determines whether the live view button 6B is pressed or whether the elapsed sleep state time is not shorter than five minutes. If a negative result is obtained in step SP9, the CPU 24 proceeds to step SP10. If an affirmative result is obtained in step SP9, the CPU 24 returns to step SP5 and repeats the same process by performing steps SP5 to SP9.

Later on, the CPU 24 proceeds to step SP10 and determines whether the stop button 6F is pressed. If a negative result is obtained in step SP11, the CPU 24 returns to step SP9 and repeats the same process by performing steps SP9 and SP10. When the user later presses the stop button 6F so that an affirmative result is obtained in step SP10, the CPU 24 proceeds to step SP11 and terminates the automatic motion picture display control processing procedure for audio recording RT.

(5) Operations Performed by Present Embodiment and the Effects of such Operations When the record button 6A is pressed, the camera-incorporated IC recorder 1, which is configured as described above, determines whether the LCD cover section 4 and camera cover 8 are retained in the ready-for-shooting state. If the LCD cover section 4 and camera cover 8 are retained in the ready-for-shooting state, the LCD 7 automatically displays a motion picture.

Consequently, a still picture based on a motion picture can be immediately rendered savable at the time of audio recording without urging the user to perform a complicated procedure.

When the record button 6A is pressed, the configuration described above determines whether the LCD cover section 4 and camera cover 8 are retained in the ready-for-shooting state. If the LCD cover section 4 and camera cover 8 are retained in the ready-for-shooting state, the LCD 7 automatically displays a motion picture. Consequently, a still picture based on a motion picture can be immediately rendered savable at the time of audio recording without urging the user to perform a complicated procedure. Thus, it is possible to record a still picture while recording audio by performing a simple procedure.

(6) Other Embodiments

The foregoing embodiment has been described on the assumption that the present invention is applied to the camera-incorporated IC recorder 1. However, the present invention is not limited to such an application. The present invention is also applicable to various other types of recording/reproducing apparatus.

The foregoing embodiment displays six thumbnail images P1-P6 of preselected business file representative images in the business file selection screen 33 and bookmark image selection screen 34. However, the present invention is not limited to such a display pattern. The number of thumbnail images to be displayed in the business file selection screen 33 and bookmark image selection screen 34 is not limited to six.

The foregoing embodiment stores the compressed audio data D2 and compressed image data D4 in the built-in flash memory 30 for recording purposes. However, the present invention is not limited to the use of such a storage medium. Instead of the built-in flash memory 30, a removable flash memory may be used with the camera-incorporated IC recorder 1. Further, a Memory Stick (Registered Trademark of Sony Corporation), optical disk, magnetooptical disk, semiconductor memory, magnetic disk, or other internal or external recording medium may be used instead of the flash memory.

The foregoing embodiment automatically displays a motion picture on the LCD 7 in the ready-for-shooting state in which the LCD cover section 4 and camera cover 8 are both open. However, the present invention is not limited to such automatic motion picture display on the LCD. Alternatively, the present invention may automatically display a motion picture on the LCD when various other CCD cameras are retained in the ready-for-shooting state.

The foregoing embodiment determines the status of both the LCD cover section 4 and camera cover 8 in accordance with the LCD cover status signal S3 and camera cover status signal S4, and detects that the LCD cover section 4 and camera cover 8 are open or closed. However, the present invention is not limited to the use of such a detection method. Alternatively, the present invention may merely detect that the LCD cover section and camera cover are open. In other words, the present invention may alternatively detect that the CCD camera is retained in the ready-for-shooting state.

The foregoing embodiment automatically displays a motion picture on the LCD 7 in the ready-for-shooting state in which the LCD cover section 4 and camera cover 8 are both open. However, the present invention is not limited to such automatic motion picture display on the LCD. If the LCD is always ready for shooting, the present invention may automatically display a motion picture on the LCD after detecting that only the CCD camera is retained in the ready-for-shooting state.

The foregoing embodiment counts the motion picture display time. When the counted elapsed time is, for instance, five minutes, the foregoing embodiment stops displaying a motion picture on the LCD 7 and places the LCD 7 in the sleep state. However, the present invention is not limited to such motion picture display termination. The present invention may alternatively stop displaying a motion picture on the LCD 7 when a predetermined value is reached by the motion picture display time.

The foregoing embodiment counts the LCD sleep time. When the counted LCD sleep time is, for instance, five minutes, the foregoing embodiment displays a motion picture again on the LCD 7. However, the present invention is not limited to such motion picture redisplay. The present invention may alternatively redisplay a motion picture on the LCD 7 when a predetermined value is reached by the LCD sleep time.

When a motion picture appears on the LCD 7, the foregoing embodiment begins to count the motion picture display time. When the counted motion picture display time is, for instance, five minutes, the foregoing embodiment stops displaying the motion picture on the LCD 7 and places the LCD 7 in the sleep state. However, the present invention is not limited to such motion picture display. When a power supply voltage is supplied to the camera-incorporated IC recorder 1 from the outside with the plug of a specified power supply kit inserted into the power connector 9, the present invention may display a motion picture on the LCD 7 at all times.

The present invention can be applied to digital cameras and various other image pickup devices in addition to recording/reproducing apparatus such as a camera-incorporated IC recorder.

It should be understood by those skilled in the art that various modifications, combinations, sub-combinations, and alterations may occur depending on design requirements and other factors insofar as they are within the scope of the appended claims or the equivalents thereof.

What is claimed is:

1. A portable recording/reproducing apparatus for recording predefined information onto a recording medium and reproducing the recorded information, the recording/reproducing apparatus comprising:
   audio recording means for collecting an external sound and outputting audio information in accordance with the results of sound collection;
   shooting means for shooting an image and outputting motion picture information in accordance with results of shooting;
   display means for displaying a motion picture in accordance with the motion picture information;
   retention means for movably retaining the shooting means between a first position defining a ready-for-shooting state and a second position defining a storage state in which shooting cannot be performed;
   detection means for detecting whether the shooting means is retained in the ready-for-shooting state by the retention means; and
   control means, which, when the detection means detects at the beginning of audio information recording that the shooting means is retained in the ready-for-shooting state, exercises control so that the motion picture based on the motion picture information appears on the display means.

2. The recording/reproducing apparatus according to claim 1,
   wherein the retention means retains both the shooting means and the display means as desired in the ready-for-shooting state or in the storage state in which shooting cannot be performed;
   wherein the detection means detects whether or not the shooting means and the display means are both retained in the ready-for-shooting state by the retention means; and
   wherein the control means, which, when the detection means detects at the beginning of audio information recording that the shooting means and the display means are both retained in the ready-for-shooting state, exercises control so that the motion picture based on the motion picture information appears on the display means.

3. The recording/reproducing apparatus according to claim 1, wherein, when the detection means detects after the start of audio information recording that the shooting means is retained in the ready-for-shooting state, the control means exercises control so that the motion picture based on the motion picture information appears on the display means.

4. The recording/reproducing apparatus according to claim 1, further comprising:
   counting means for counting a display time of displaying the motion picture in accordance with the motion picture information;
   wherein, when a predetermined value is reached by the display time that is counted by the counting means, the control means exercises control so that the display means stops displaying the motion picture in accordance with the motion picture information.

5. The recording/reproducing apparatus according to claim 4,
wherein the counting means counts the elapsed time from the instant at which the display of the motion picture based on the motion picture information is terminated; and
wherein, when a predetermined value is reached by the elapsed time that is counted by the counting means from the instant at which the display of the motion picture based on the motion picture information is terminated, the control means exercises control so that the display means redisplays the motion picture based on the motion picture information.

6. A recording/reproducing apparatus control method for controlling a portable recording/reproducing apparatus that records predefined information onto a recording medium and reproduces the recorded information, the method comprising:
starting the recording of audio information that is obtained by collecting the external sound;
detecting whether or not a shooting unit, is retained at a first position defining in a ready-for-shooting state, or at a second position defining a storage state in which shooting cannot be performed; and
displaying a motion picture based on motion picture information on a display device, which is obtained by shooting an image, when the shooting unit is found to be in the ready-for-shooting state at the beginning of audio information recording.

7. The recording/reproducing apparatus control method according to claim 6, further comprising:
detecting whether or not the shooting unit and the display unit, are both retained in the ready-for-shooting state; and
wherein, when the shooting unit and the display unit are both found to be retained in the ready-for-shooting state at the beginning of audio information recording, displaying the motion picture based on the motion picture information.

8. The recording/reproducing apparatus control method according to claim 6, further comprising:
displaying the motion picture based on the motion picture information when the shooting unit is found to be retained in the ready-for-shooting state after the start of audio information recording.

9. The recording/reproducing apparatus control method according to claim 6, further comprising:
counting a display time of displaying the motion picture based on the motion picture information; and
causing the display unit to stop displaying the motion picture based on the motion picture information when a predetermined value is reached by the counted display time.

10. The recording/reproducing apparatus control method according to claim 9, further comprising:
counting the elapsed time from the instant at which the display of the motion picture based on the motion picture information is terminated; and
redisplaying the motion picture based on the motion picture information when a predetermined value is reached by the counted elapsed time.

11. A portable recording/reproducing apparatus for recording predefined information onto a recording medium and reproducing the recorded information, the recording/reproducing apparatus comprising:
an audio recording unit configured to collect an external sound and output audio information in accordance with the results of sound collection;
a shooting unit configured to shoot an image and output motion picture information in accordance with results of shooting;
a display unit configured to display a motion picture in accordance with the motion picture information;
a retention unit configured to movably retain the shooting unit between a first position defining a ready-for-shooting state and a second position defining a storage state in which shooting cannot be performed;
a detection unit configured to detect whether the shooting unit is retained in the ready-for-shooting state by the retention unit; and
a control unit, which, when the detection unit detects at the beginning of audio information recording that the shooting unit is retained in the ready-for-shooting state, being configured to control so that the motion picture based on the motion picture information appears on the display unit.

* * * * *